United States Patent [19]

Fuchs et al.

[11] 4,036,825

[45] July 19, 1977

[54] MONOAZO REACTIVE DYESTUFFS

[75] Inventors: Hermann Fuchs, Kelkheim, Taunus; Fritz Meininger, Frankfurt am Main, both of Germany

[73] Assignee: Hoechst Aktiengesellschaft, Frankfurt am Main, Germany

[21] Appl. No.: 730,428

[22] Filed: Oct. 7, 1976

Related U.S. Application Data

[63] Continuation-in-part of Ser. No. 303,625, Nov. 3, 1972, abandoned.

[30] Foreign Application Priority Data

Nov. 5, 1971   Germany ............................ 2154942

[51] Int. Cl.$^2$ .................... C09B 29/06; C09B 29/26; C09B 29/30; C09B 29/38
[52] U.S. Cl. .................................. 260/196; 260/163; 260/198; 260/199; 260/205; 260/206; 260/207; 260/207.1; 260/207.5
[58] Field of Search ............... 260/196, 198, 199, 205, 260/206, 207, 207.1, 207.5

[56] References Cited

U.S. PATENT DOCUMENTS

| | | | |
|---|---|---|---|
| 2,973,351 | 2/1961 | de Montmollin et al. | 260/199 |
| 3,126,368 | 3/1964 | Bossard et al. | 260/199 X |
| 3,360,524 | 12/1967 | Scherer et al. | 260/198 X |
| 3,413,280 | 11/1968 | de Montmollin et al. | 260/198 X |
| 3,435,023 | 3/1969 | Meininger et al. | 260/207.1 X |
| 3,637,648 | 1/1972 | Kuhne et al. | 260/196 X |
| 3,642,765 | 2/1972 | Oesterlein et al. | 260/199 X |

FOREIGN PATENT DOCUMENTS

| | | | |
|---|---|---|---|
| 1,166,913 | 10/1969 | United Kingdom | 260/198 |

*Primary Examiner*—Charles F. Warren
*Attorney, Agent, or Firm*—Curtis, Morris & Safford

[57] ABSTRACT

Fiber-reactive monoazo dyestuffs which, in form of free acids, correspond to the general formula

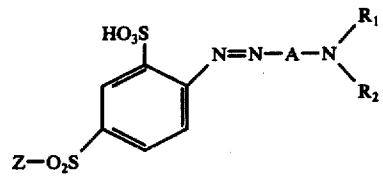

in which Z represents one of the groupings

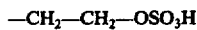

$-CH_2-CH_2-OSO_3H$ or

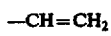

$-CH=CH_2$ A stands for benzene, naphthalene or pyrazole unsubstituted or substituted by alkyl, alkoxy or by a phenyl group which is unsubstituted or may be substituted by alkyl, alkoxy, hydroxy, cyano, nitro, sulfonic acid, sulfonic acid amide, carboxylic acid amide, chlorine, bromine, carboxylic acid, acetylamino, benzoylamino, trifluoromethyl, carbalkoxy, B-sulfatoethylsulfonyl or vinylsulfonyl, and wherein, if A represents a benzene or naphthalene radical the azo group and the amino group of the formula $-NR_1R_2$ standing in ortho or para position to each other, and if A is pyrazole, the group $-NR_1R_2$ is standing in 5-position and the azo group in 4-position of the pyrazole, $R_1$ and $R_2$ are different or the same and each stand for hydrogen or alkyl which may be substituted by chlorine, hydroxy, cyano, alkanoyloxy, benzoyloxy, nitrobenzoyloxy, chlorobenzoyloxy, phenyl or phenyl substituted by alkyl, alkoxy, alkyl-sulfone, sulfonic acid, sulfonic acid amide, carboxylic acid amide, nitro, trifluoromethyl, chlorine or bromine, which are suitable for the dyeing and printing of native and regenerated cellulose fibers, but especially advantageous for dyeing or printing fibers or fabrics of nitrogen - containing fibers of native or synthetic origin.

8 Claims, No Drawings

MONOAZO REACTIVE DYESTUFFS

This is a continuation-in-part application to our copending application Ser. No. 303,625, filed Nov. 3, 1972, and now abandoned.

The present invention concerns novel fiber-reactive monoazo dyestuffs which, in the form of free acids, correspond to the general formula (1)

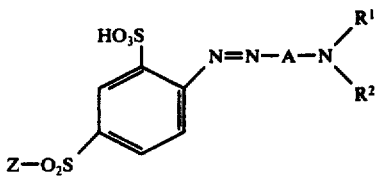
(1)

in which Z represents one of the groupings $$-CH_2-CH_2-OSO_3H \quad (2)$$

or $$-CH=CH_2 \quad (3)$$

A stands for an unsubstituted or substituted benzene, napthalene or pyrazole radical, the azo group and the amino group of the formula $-NR_1R_2$ standing in ortho or para position to each other if A represents a benzene or naphthalene radical and if A is pyrazole, group $-NR_1R_2$ standing in 5-position and the azo group in 4-position of the pyrazole, and group A may contain further substituents, preferably methyl, ethyl, propyl, butyl, alkoxy groups having 1 to 4 carbon atoms in the alkyl rest, a phenyl group which may carry lower alkyl, alkoxy, hydroxy, cyano, nitro, sulfonic acid, sulfonic acid amide and/or carboxylic acid amide groups and/or chlorine or bromine atoms, and $R_1$ and $R_2$ represent hydrogen, lower alkyl groups, preferably methyl, ethyl, propyl or butyl groups which may contain other substituents, preferably chlorine atoms or hydroxy, cyano, phenyl, acyloxy such as acetoxy, propionyloxy, butyryloxy, benzoyloxy or nitro- or chloro-benzoyloxy groups; or aryl groups preferably an unsubstituted phenyl group or a phenyl group which is preferably substituted by lower alkyl, alkoxy, alkyl-sulfone, sulfonic acid, sulfonic acid amide, carboxylic acid amide, nitro, trifluoromethyl groups and/or chlorine or bromine atoms.

Furthermore, the present invention relates to a process for preparing these dyestuffs, wherein diazo components of the general formula (4)

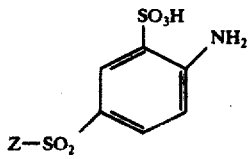
(4)

in which Z has the meanings given above, are diazotized and coupled with coupling components of the general formula (5)

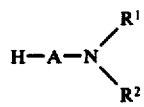
(5)

in which A, $R_1$ and $R_2$ have the meanings given above, in a strongly acid to weakly acid range at pH-values of 5 to 0, preferably 4 to 1, and at temperatures in the range of from 0° to 40° C. For isolating the dyestuffs formed, the dyestuff solutions or suspensions obtained are neutralized with alkali metal hydroxides or carbonates to a pH-value in the range of from 5.5 to 7.0 and the dyestuffs are then salted out with alkali metal chlorides or isolated from the aqueous solutions by spray-drying.

The dyestuffs of the formula (1) in which Z represents the sulfatoethyl group can also be converted into dyestuffs of the formula (1) in which Z represents a vinyl group, by dissolving them in aqueous solutions having an alkaline action and which preferably contain sodium hydroxide, by adjusting the mixtures to a pH-value of 8-14, preferably 11 to 13, by the addition of strong inorganic bases, preferably sodium hydroxide solution and heating the mixtures for 2 to 10 minutes to 30°-50° C until the pH-value is no longer falling. The alkali metal compounds may then be obtained, after neutralization with hydrochloric acid, by salting out with sodium or potassium chloride or by spray-drying of the neutralized solutions.

Of the great number of coupling components which are suitable and utilisable for the manufacture of the novel dyestuffs and which are capable of coupling owing to an unsubstituted or substituted amino group, there may be mentioned for example, the following compounds: the N-mono- and N-di-methyl compounds of aniline, of o-toluidine, m-toluidine or m-chloroaniline, the N-mono- and N-diethyl compounds of aniline, of o-toluidine, m-toluidine and m-chloroaniline, the N-mono- and N-di-β-oxyethyl-compounds of aniline and m-toluidine, N-ethyl-N-β-cyanoethylaniline and -m-toluidine, N-ethyl-N-β-oxyethylaniline and m-toluidine, N-ethyl-N-β-cyanoethyl-2-methoxy-5-acetaminoaniline, N-ethyl-N-β-cyanoethyl-2,5-dimethoxyaniline, N-diethyl-2-methoxy-5-methyl-aniline, 2-amino-8-naphthol-6-sulfonic acid, 2-N-methylamino-8-napthol-6-sulfonic acid, 2-phenylamino-8-napthol-6-sulfonic acid, 2-p-tolylamino-8-napthol-6-sulfonic acid, 2-amino-8-napthol-5-sulfonic acid, 2-amino-naphthalene-5- and -6-sulfonic acid, 2-N-methylamino-naphthalene-6- or -7-sulfonic acid, 1-phenylaminonaphthalene-8-sulfonic acid, 1-phenyl-3-methyl-5-aminopyrazole, 1-(4'-sulfophenyl)-3-methyl-5-aminopyrazole, 1-(4'-sulfatoxyethylsulfonylphenyl)-3-methoxy-5-aminopyrazole, 1-(2'-methoxy-5'-sulfatoxyethylsulfonylphenyl)-3-methyl-5-amino-pyrazole, 1-(4'-methoxyphenyl)-3-methyl-5-aminopyrazole, 1-(2',5'-dichloro-4'-sulfophenyl)-3-methyl-5-aminopyrazole, 2-aminonaphthalene-3,6- and 3,7-disulfonic acid.

The monoazo dyestuffs according to the invention are suitable for the dyeing and printing of native and regenerated cellulose fibers such as cotton, linen or viscose acetate rayon. For this purpose, they are applied onto these textile materials according to one of the dyeing and printing methods usually employed for reactive dyestuffs and fixed with the aid of an acid-binding agent, such as sodium or potassium hydroxide, sodium or potassium carbonate, di-sodium phosphate, sodium hydrogeno-carbonate, sodium ortho-silicate, which agent is applied prior to, during or after the application of the dyestuffs to the fibrous material or with which agent the textile material has been treated before, during or after application of the dyestuff, the fixation being effected at room temperature or at an elevated temperature. The novel dyestuffs are mainly used for dyeing or printing fibers and fabrics of nitrogen-containing fibers of native or synthetic origin, for example fibers or fabrics of silk, wool, polyamide, or polyurethane fibers. As regards the mentioned nitrogen-containing fibers, the novel dyestuffs are in the first instance suitable for the dyeing of wool. For dyeing wool and polyamide fibers, the novel dyestuffs are applied onto these fibers from a neutral, preferably weakly acidic dyebath having a constant or practically constant pH-value. Dyeing is then effected preferably at temperatures in the range of from 70° to 120° C in the presence of compounds usually employed in the dyeing of nitrogen-containing textile materials, for example sodium sulfate, ammonium acetate, surface active compounds such as quaternary ammonium salts and non-ionogenic wetting and dispersing agents. The addition of the sodium salt of β-N-methylamino-ethanesulfonic acid has proved to be particularly favourable with regard to the egality of the obtained dyeings. The pH-value of the dyebath during the dyeing process may also be varied by adding of acids or acid salts or alkalis or alkali metal salts, for example by beginning the dyeing process at a pH-value of 4.5 and increasing the pH-value during dyeing to 7.5.

The monoazo dyestuffs according to the invention yield on native and regenerated cellulose materials dyeings that have very good fastness to washing and to light. They have an excellent affinity to nitrogen-containing native or synthetic fibers such as wool, polyamides or polyurethanes. The dyeings produced with the dyestuffs of the invention have good to very good fastness to light and are distinguished by very good fastness to wet processing, i.e. to washing, to bleaching with peroxide, to alkaline milling, to fulling and to decatizing. Moreover, the dyestuffs permit easier combinations, which property makes them particularly suited for the production of mixed shades on woollen textiles.

Among the dyestuffs of the invention of the formula (1), there are mentioned as preferred and advantageous the monoazo dyestuffs which, in form of the free acids, correspond to the general formula

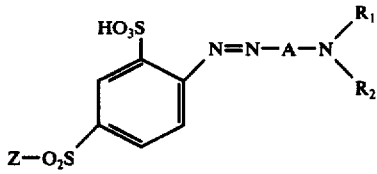

wherein Z represents one of the groupings

or

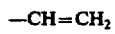

A stands for a benzene or naphthalene radical in which the azo group and the amino group of the formula $-NR_1R_2$ are standing in ortho or in para-position to each other and the radical A may be substituted by hydroxy, sulfonic acid, alkyl groups of 1 to 4 carbon atoms, alkoxy groups having 1 to 4 carbon atoms in the alkyl group, halogen atoms, preferably chlorine, acetylamino, carboxylic acid, carboxylic acid amide, sulfonic acid amide, benzoylamino and/or trifluoromethyl groups, or A stands for a pyrazole group in which the azo group stands in 4-position and the group $-NR_1R_2$ stands in 5-position of the pyrazole and in which th 3-position is substituted by methyl and in which the 1-position contains preferably a phenyl group, a sulfophenyl group or a vinyl-sulfonyl- or β-sulfatoethyl- sulfonyl group, the phenyl rests may be substituted by chlorine, by nitro, methyl, ethyl, methoxy, ethoxy, carboxy, carbonamide, carboxyalkyl ester, sulfonamide or cyano groups or by bromide, and $R_1$ and $R_2$ which may identical or different each stand for hydrogen, a methyl, ethyl, propyl, hydroxyethyl, hydroxypropyl, cyanoethyl, cyanopropyl, acetoxypropyl, butyl, acetoxyethyl, benzoyloxyethyl, benzoyloxypropyl or phenylalkyl groups having 1 to 4 carbon atoms in the alkyl chain or for phenyl which may be substituted by chlorine and/or methyl or ethyl groups.

As particularly advantageous dyestuffs of the invention of the formula (1), there are to be mentioned the dyestuffs of the formula

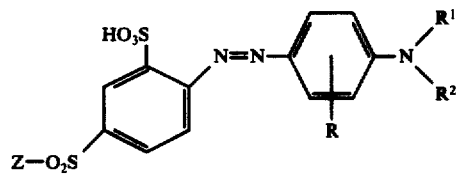

in which Z has the meaning given above, R arepresents hydrogen, a methyl, ethyl, ethoxy or methoxy group or chlorine, and $R_1$ and $R_2$ which may be identical or different each represent hydrogen, a methyl, ethyl, propyl, butyl, hydroxyethyl, hydroxypropyl, cyanoethyl, acetoxyethyl group or a phenyl group, and the dyestuffs of the formula

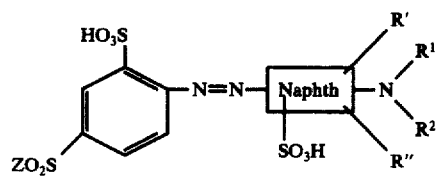

in which Z has the meaning given above, Naphth stands for a naphthalene radical in which the group $-NR_1R_2$ stands in para or ortho-position to the azo group, R' stands for hydrogen, a hydroxy, methyl or sulfo group, and R" stands for hydrogen or a sulfo group, $R_1$ and $R_2$ which may be identical or different each stand for hydrogen, a methyl, ethyl, phenyl or tolyl group, and the dyestuffs of the formula

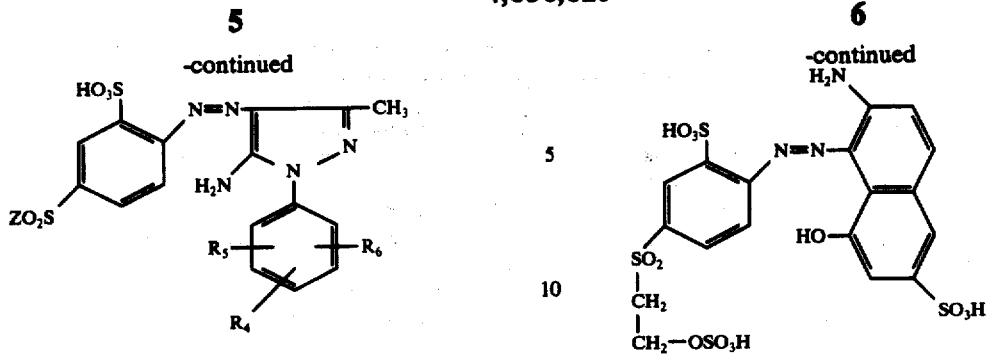

in which Z has the meaning given above, $R_4$ stands for a sulfonic acid, β-sulfatoethyl-sulfonyl or vinyl-sulfonyl group or a methoxy group, $R_5$ represents hydrogen, a methyl or ethyl group or a chlorine atom and $R_6$ is hydrogen, methoxy, ethoxy, methyl or chlorine.

Dyestuff with diazo components of the afore-defined structure have not been known hitherto. Compared to dyestuffs which do not contain an additional sulfo group in 0-position to the azo group, they are distinguished by the fact that they are better soluble in weakly acidic and, in particular, alkaline aqueous dyebaths or printing pastes, and that not fixed dyestuff proportions can be washed out more easily from the fibers and that the shades produced with them are clearer and have better fastness to washing and to rubbing.

The following Examples illustrate the invention. The amines used for the preparation of the diazo components and the coupling components were used in the form of alkali metal salts of the mentioned free acids.

EXAMPLE 1

0.1 Mole of 1-aminobenzene-4-(β-sulfatoxyethylsulfone)-2-sulfonic acid were dissolved in 150 ml of water, combined with 50 g of ice and 25 g of 37% hydrochloric acid and diazotized, while stirring, by dropwise addition of 20.0 ml of a 5N-sodium nitrite solution below the surface of the solution. After 15 minutes, the slight excess of free nitrous acid was destroyed by a small amount of amidosulfonic acid and the clear diazonium solution was combined with 0.1 mol of 2-amino-8-naphthol-6-sulfonic acid. During the coupling reaction which was completed after 2 hours at 15°-20° C, the total amount of 2-amino-8-naphthol-6-sulfonic acid had dissolved. The pH-value of the dyestuff solution was adjusted to 6.5 by the addition of soda ash and the whole was combined with potassium chloride at a quantity of 26%, referred to the volume of the solution.

The whole was stirred for 4 hours, the dyestuff was filtered off and dried. A dark-brown powder was obtained which yielded, when applied from a weakly acetic boiling dyebath onto wool, a clear, bluish red dyeing that had very good fastness to wet processing and to light. Applied onto cotton, in the presence of alkali, it yielded a bluish red dyeing having very good fastness to wet processing and good fastness to light.

In the form of the free acid, the dyestuff corresponds to the formula

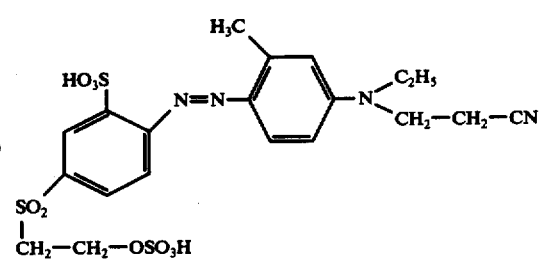

EXAMPLE 2

0.2 Mole of 1-aminobenzene-4-(β-sulfatoxyethylsulfone)-2-sulfonic acid were dissolved in 150 ml of water, combined with 50 g of ice and 25 g of 37% hydrochloric acid and diazotized, while stirring, by running in 20 ml of 5N-sodium nitrite solution below the surface of the liquid. After 15 minutes, a small amount of amidosulfonic acid was added to destroy the excess of nitrous acid and the clear solution of the diazonium salt was combined with a solution of 0.1 mole of N-ethyl-N-β-cyanoethyl-m-toluidine, dissolved in 100 ml of water and 10 g of 37% hydrochloric acid, and the pH-value of the coupling mixture was adjusted to 1.5-1.8 by dropwise addition of a 20% by weight sodium acetate solution. The coupling reaction was completed after 12 hours. The dyestuff that had precipitated was dissolved by neutralizaton (pH = 6.5) with calcinated sodium carbonate, the solution was clarified and the dyestuff was precipitated by the addition of 20% of sodium chloride, referred to the volume of the solution and by addition of 10 g of hydrochloric acid having a strength of 37%, at a pH-value of 2.5. A light brown dyestuff powder was obtained after drying, which yielded, when applied from a boiling, weakly acetic bath onto wool, an orange dyeing which was found to have a very good fastness to wet processing and good fastness to light. In the form of the free acid, the dyestuff corresponds to the formula

EXAMPLE 3

0.1 Mole of 1-aminobenzene-4-(β-sulfatoxyethylsulfone)-2-sulfonic acid were dissolved in 150 ml of water, combined with 50 g of ice and 25 g of 37% hydrochloric acid and diazotized, while stirring by running in 20 ml of 5N-sodium nitrite solution below the surface of the liquid. After 15 minutes, traces of free nitrous acid were dissolved by the addition of a small amount of aminosulfonic acid. The clear solution of the diazonium salt was combined with a neutral solution of 0.1 mole of 1-(2',5'-dichloro-4'-sulfophenyl)-3-methyl-5-aminopyrazole in 150 ml of water and the pH-value was adjusted to 4.5 by means of crystallized sodium acetate. The coupling reaction was completed after 3 hours. The dyestuff which in part had precipitated dissolved completely upon neutralization (pH = 6.5) with calcinated sodium carbonate. A yellow dyestuff powder was isolated by evaporation to dryness which yielded, when applied onto wool from a boiling weakly acetic bath a yellow dyeing that had very good fastness to light and to wet processing.

When applied onto cotton in the presence of alkali, the dyestuff yielded a yellow dyeing which had good fastness to light and very good fastness to wet processing.

In the form of the free acid, the dyestuff corresponded to the formula

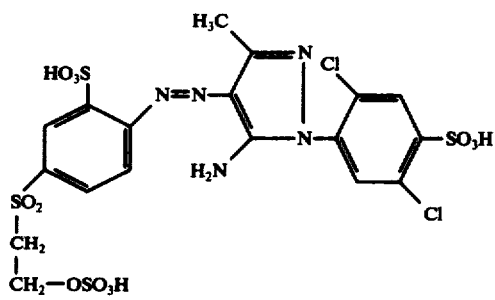

EXAMPLE 4

0.1 Mole of 1-aminobenene-4-vinylsulfone-2-sulfonic acid were dissolved with 5.3 g of calcinated soda in 100 ml of water at a pH-value of 6.5, combined with 20 ml of a 5N-sodium nitrite solution and allowed to run in slowly into a mixture of 100 g of ice and 25 g of 37% by weight hydrochloric acid, while stirring. After 15 minutes, the excess nitrous acid was destroyed with a small amount of amidosulfonic acid and 0.1 mole of 2-aminonaphthalene-5-sulfonic acid were strewn in. The pH-value of the coupling mixture was slowly adjusted to 2.5–3.0 by means of crystalline sodium acetate and maintained at room temperature until coupling was completed. The solution was then neutralized with calcinated sodium carbonate to a pH-value of 5.5 and the dyestuff was salted out with 20% of sodium chloride, referred to the volume of the reaction solution. A dark red powder was obtained after filtration and drying, which yielded, when printed onto polyamide fibers, a clear yellowish red print that had very good fastness to wet processing and to light. In the form of the free acid, the dyestuff corresponds to the formula

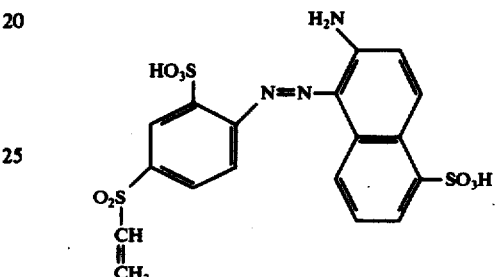

The following Table indicates other examples of dyestuffs which were prepared according to the methods described in Examples 1 to 4.

TABLE

| Example No. | Formula | Shade on wool |
|---|---|---|
| 5 | ![structure with HO₃S, N=N, H₂N, SO₂—CH₂—CH₂—OSO₃H, SO₃H] | yellowish red |
| 6 | ![structure with HO₃S, N=N, HN—CH₃, SO₂—CH₂—CH₂—OSO₃H, HO₃S] | bluish red |
| 7 | ![structure with HO₃S, N=N, HN—phenyl, SO₂—CH₂—CH₂—OSO₃H, SO₃H] | bluish red |

TABLE-continued

| Example No. | Formula | Shade on wool |
|---|---|---|
| 8 | (structure: 2-sulfo-4-(β-sulfatoethylsulfonyl)phenyl azo coupled to 1-methylamino-6-sulfo-naphthalene) | bluish red |
| 9 | (structure: 2-sulfo-4-(β-sulfatoethylsulfonyl)phenyl azo coupled to 8-methylamino-1-hydroxy-3-sulfo-naphthalene) | violet |
| 10 | (structure: 2-sulfo-4-(β-sulfatoethylsulfonyl)phenyl azo coupled to 8-anilino-1-hydroxy-3-sulfo-naphthalene) | violet |
| 11 | (structure: 2-sulfo-4-(β-sulfatoethylsulfonyl)phenyl azo coupled to N-ethyl-N-(β-hydroxyethyl)aniline) | yellowish brown |
| 12 | (structure: 2-sulfo-4-(β-sulfatoethylsulfonyl)phenyl azo coupled to N-methyl-N-(β-cyanoethyl)-3-methylaniline) | orange |
| 13 | (structure: 2-sulfo-4-(β-sulfatoethylsulfonyl)phenyl azo coupled to N,N-bis(β-acetoxyethyl)-3-methylaniline) | orange |
| 14 | (structure: 2-sulfo-4-(β-sulfatoethylsulfonyl)phenyl azo coupled to 3-methyl-5-amino-1-phenylpyrazole) | yellow |

TABLE-continued

| Example No. | Formula | Shade on wool |
|---|---|---|
| 15 | (pyrazole azo dye with HO₃S-phenyl-SO₂-CH₂-CH₂-OSO₃H group, H₃C and H₂N on pyrazole, N-phenyl-SO₃H) | yellow |
| 16 | (pyrazole azo dye with HO₃S-phenyl-SO₂-CH₂-CH₂-OSO₃H group, H₃C and H₂N on pyrazole, N-phenyl-OCH₃) | yellow |
| 17 | (pyrazole azo dye with HO₃S-phenyl-SO₂-CH₂-CH₂-OSO₃H group, H₃C and H₂N on pyrazole, N-phenyl bearing SO₂CH₂CH₂OSO₃H and H₃CO) | yellow |
| 18 | (pyrazole azo dye with HO₃S-phenyl-SO₂-CH₂-CH₂-OSO₃H group, H₃C and H₂N on pyrazole, N-phenyl-SO₂CH₂CH₂OSO₃H) | yellow |
| 19 | (pyrazole azo dye with HO₃S-phenyl-SO₂-CH₂-CH₂-OSO₃H group, H₃C and H₂N on pyrazole, N-phenyl bearing SO₃H and Cl) | yellow |
| 20 | (naphthalene azo dye: HO₃S-phenyl-SO₂-CH₂-CH₂- coupled to naphthalene with H₂N, HO, SO₃H) | bluish red |
| 21 | (HO₃S-phenyl-SO₂-CH=CH₂ azo coupled to phenyl with N(C₂H₅)(CH₂CH₂CN) and H₃C) | orange |

TABLE-continued

| Example No. | Formula | Shade on wool |
|---|---|---|
| 22 | 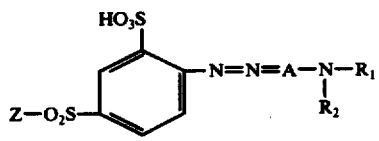 | bluish red |
| 23 | | orange |
| 24 | | orange |

We claim:

1. A monoazo dyestuff in the free acid form of the formula

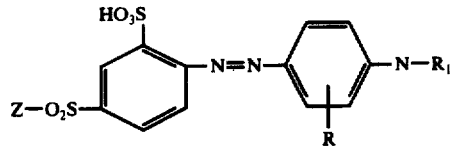

wherein Z is —CH₂—CH₂—OSO₃H or —CH=CH₂, A is phenylene, naphthylene or either phenylene or naphthylene substitued by hydroxy, sulfonic acid, alkyl of 1 to 4 carbon atoms, alkoxy of 1 to 4 carbon atoms, halogen, acetylamino, carboxylic acid, carboxylic acid amide, sulfonic acid amide, benzoylamino or trifluoromethyl, the azo and the —NR₁R₂ groups being in ortho- or para- position to each other on A, and R₁ and R₂ each is hydrogen, alkyl of 1 to 4 carbon atoms, alkyl of 1 to 4 carbon atoms substituted by hydroxy, cyano, acetoxy, benzyloxy or phenyl, phenyl or phenyl substituted by halogen or lower alkyl.

2. A dyestuff according to claim 1 of the formula wherein R is hydrogen, methyl, methoxy, ethyl, ethoxy or chlorine, and R₁ and R₂ each is hydrogen, methyl, ethyl, propyl, butyl, hydroxyethyl, hydroxypropyl, cyanoethyl, acetoxyethyl or phenyl.

3. A dyestuff according to claim 1 of the formula

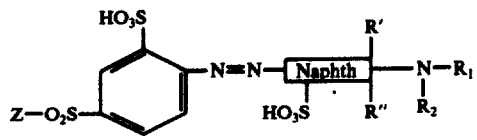

wherein Naphth is naphthylene, R' is hydrogen, hydroxy, methyl or sulfo, R" is hydrogen or sulfo, and R₁ and R₂ each is hydrogen, methyl, ethyl, phenyl or tolyl.

4. A dyestuff as claimed in claim 1 having the formula

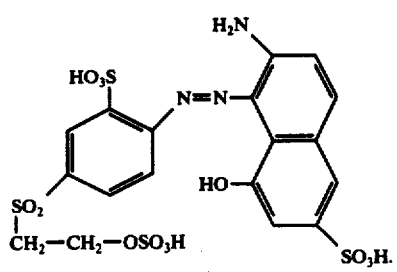

5. A dyestuff as claimed in claim 1 having the formula

-continued
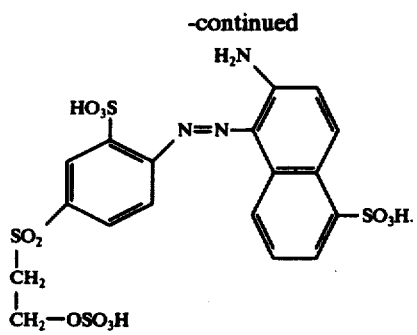
6. A dyestuff as claimed in claim 1 having the formula
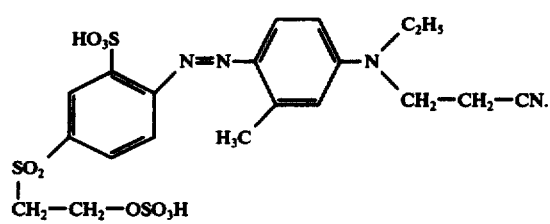
7. A dyestuff as claimed in claim 1 having the formula
8. A dyestuff as claimed in claim 1 having the formula
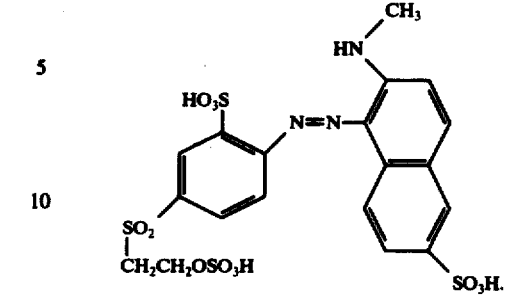
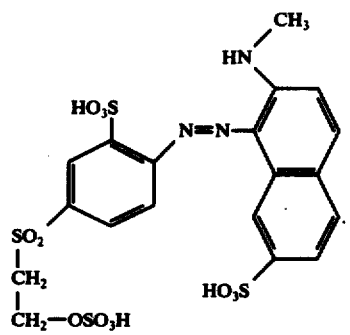
* * * * *